US011282281B2

(12) United States Patent
Shahraray et al.

(10) Patent No.: US 11,282,281 B2
(45) Date of Patent: Mar. 22, 2022

(54) ACTIVATION OF EXTENDED REALITY ACTUATORS BASED ON CONTENT ANALYSIS

(71) Applicant: AT&T Intellectual Property I, L.P., Atlanta, GA (US)

(72) Inventors: Behzad Shahraray, Holmdel, NJ (US); Eric Zavesky, Austin, TX (US); David Crawford Gibbon, Lincroft, NJ (US); Tan Xu, Bridgewater, NJ (US); Zhu Liu, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 40 days.

(21) Appl. No.: 16/682,379

(22) Filed: Nov. 13, 2019

(65) Prior Publication Data

US 2021/0142571 A1 May 13, 2021

(51) Int. Cl.
*G09G 5/00* (2006.01)
*G06T 19/00* (2011.01)
*G06T 19/20* (2011.01)
*G06F 3/01* (2006.01)
*G02B 27/01* (2006.01)

(52) U.S. Cl.
CPC .......... *G06T 19/006* (2013.01); *G02B 27/017* (2013.01); *G06F 3/011* (2013.01); *G06F 3/017* (2013.01); *G06T 19/20* (2013.01); *G02B 2027/014* (2013.01)

(58) Field of Classification Search
None
See application file for complete search history.

(56) References Cited

U.S. PATENT DOCUMENTS

| | | | | |
|---|---|---|---|---|
| 9,448,613 | B1* | 9/2016 | Liljegren | G06F 1/3296 |
| 2006/0031426 | A1* | 2/2006 | Mesarina | H04L 67/34 |
| | | | | 709/220 |
| 2008/0238937 | A1* | 10/2008 | Muraki | A63F 13/211 |
| | | | | 345/619 |
| 2014/0347177 | A1* | 11/2014 | Phan | H04N 21/4382 |
| | | | | 340/407.1 |
| 2015/0154966 | A1* | 6/2015 | Bharitkar | G08B 6/00 |
| | | | | 381/23 |
| 2016/0093114 | A1* | 3/2016 | Piche | G06T 15/30 |
| | | | | 345/420 |

(Continued)

OTHER PUBLICATIONS

"Most Immersive Virtual Reality Experience Ever" printed on Nov. 13, 2019 from: https://www.thevoid.com/.

(Continued)

*Primary Examiner* — Anh-Tuan V Nguyen (57) ABSTRACT

In one example, a method performed by a processing system in a telecommunications network includes acquiring the media stream and identifying an anchor in a scene of the media stream. The anchor is a presence in the scene that has a physical effect on the scene. A type and a magnitude of the physical effect of the anchor on the scene is estimated. An actuator in a vicinity of the user endpoint device that is capable of producing a physical effect in the real world to match the physical effect of the anchor on the scene is identified. A signal is sent to the actuator. The signal controls the actuator to produce the physical effect in the real world when the physical effect of the anchor on the scene occurs in the media stream.

20 Claims, 3 Drawing Sheets

(56) References Cited

U.S. PATENT DOCUMENTS

| | | | | |
|---|---|---|---|---|
| 2016/0133227 A1* | 5/2016 | Yoon | ................ | G09G 3/14 |
| | | | | 345/593 |
| 2017/0076565 A1* | 3/2017 | Saboune | ................ | G08B 6/00 |
| 2017/0232338 A1* | 8/2017 | Goslin | ................ | A63F 13/327 |
| | | | | 463/31 |
| 2017/0370604 A1* | 12/2017 | Carey | ................ | F24F 11/30 |
| 2018/0089893 A1* | 3/2018 | Kukis | ................ | G02B 27/0093 |
| 2018/0232051 A1* | 8/2018 | Wu | ................ | G06K 9/00718 |
| 2019/0147632 A1* | 5/2019 | Wu | ................ | G06T 11/60 |
| | | | | 345/633 |
| 2019/0276051 A1* | 9/2019 | Marti | ................ | B60K 37/06 |
| 2020/0036592 A1* | 1/2020 | Kholaif | ................ | H04L 41/0886 |
| 2020/0192480 A1* | 6/2020 | Cruz Hernandez | ..... | G06F 3/011 |
| 2020/0393904 A1* | 12/2020 | Sinclair | ................ | G05G 13/00 |

OTHER PUBLICATIONS

"World's Most Advanced Virtual Reality Chair" printed on Nov. 13, 2019 from: http://wowvrpod.com/.

James Hayward "Haptics 2020-2030: Technologies, Markets and Player" downloaded from: https://www.idtechex.com/en/research-report/haptics-2020-2030-technologies-markets-and-players/684; printed on Nov. 13, 2019.

* cited by examiner

ACTIVATION OF EXTENDED REALITY ACTUATORS BASED ON CONTENT ANALYSIS

The present disclosure relates generally to extended reality (XR) media, and relates more particularly to devices, non-transitory computer-readable media, and methods for activating extended reality actuators based on content analysis.

BACKGROUND

Extended reality (XR) is an umbrella term used to describe various types of immersive technology, including augmented reality (AR), virtual reality (VR), and mixed reality (MR), in which the real-world environment may be enhanced or augmented with virtual, computer-generated objects or actions. As XR technology improves, there has been an increasing effort to make the user experience more realistic. For instance, in addition to inserting visible and/or audible virtual objects into the presentation of an XR media, the presentation may also include manipulation of physical objects in the proximity of the user, e.g., by activating actuators that introduce physical motion, tactile effects, temperature changes, and the like.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure enhances extended reality (XR) media by activating actuators based on content analysis of the media, where the content analysis may potentially be performed in real time (e.g., as the media is being delivered to a user endpoint device). In one example, a method formed by a processing system in a telecommunications network includes acquiring a media stream that is being delivered to a user endpoint device in the telecommunications network, identifying an anchor in a scene of the media stream, wherein the anchor comprises a presence in the scene that has a physical effect on the scene, estimating a type and a magnitude of the physical effect of the anchor on the scene, identifying an actuator in a vicinity of the user endpoint device that is capable of producing a physical effect in the real world to match the physical effect of the anchor on the scene, and sending a signal to the actuator, wherein the signal controls the actuator to produce the physical effect in the real world when the physical effect of the anchor on the scene occurs in the media stream.

In another example, a non-transitory computer-readable medium stores instructions which, when executed by a processing system in a telecommunications network, cause the processing system to perform operations. The operations include acquiring a media stream that is being delivered to a user endpoint device in the telecommunications network, identifying an anchor in a scene of the media stream, wherein the anchor comprises a presence in the scene that has a physical effect on the scene, estimating a type and a magnitude of the physical effect of the anchor on the scene, identifying an actuator in a vicinity of the user endpoint device that is capable of producing a physical effect in the real world to match the physical effect of the anchor on the scene, and sending a signal to the actuator, wherein the signal controls the actuator to produce the physical effect in the real world when the physical effect of the anchor on the scene occurs in the media stream.

In another example, a device includes a processor and a non-transitory computer-readable medium that stores instructions which, when executed by the processor, cause the processing system to perform operations. The operations include acquiring a media stream that is being delivered to a user endpoint device in the telecommunications network, identifying an anchor in a scene of the media stream, wherein the anchor comprises a presence in the scene that has a physical effect on the scene, estimating a type and a magnitude of the physical effect of the anchor on the scene, identifying an actuator in a vicinity of the user endpoint device that is capable of producing a physical effect in the real world to match the physical effect of the anchor on the scene, and sending a signal to the actuator, wherein the signal controls the actuator to produce the physical effect in the real world when the physical effect of the anchor on the scene occurs in the media stream.

As discussed above, as XR technology improves, there has been an increasing effort to make the user experience more realistic. For instance, in addition to inserting visible and/or audible virtual objects into the presentation of an XR media, the presentation may also include manipulation of physical objects in the proximity of the user, e.g., by activating actuators that introduce physical motion, tactile effects, temperature changes, and the like.

In some cases, the stream of XR media may include metadata that indicates, to a controller, when and how to activate specific actuators or types of actuators. The metadata may be embedded in one or more additional synchronized tracks of the XR media. For instance, a video chunk downloaded from a server may include metadata that specifies a time at which to activate a rumble mechanism in a chair or at which to dim the lights. However, coordinating the activation of the actuators with precise events in the media stream is an expensive, and typically manually driven, process. For instance, a human operator must review the media stream and manually add the proper metadata at the appropriate times. Moreover, because this process is typically performed in advance of the media stream being presented on an endpoint device, it is difficult to adapt effectively for live events or for media streams for which no metadata has been inserted in advance.

Examples of the present disclosure perform content analysis of an XR media stream e.g., potentially in real time, as the XR media stream is being presented) in order to detect time points in the media stream at which a physical actuator may be actuated to enhance the presentation. In particular, the physical actuator may produce physical effects in the real world that mimic the physical effects of one or more objects or effects in a scene of the media stream, thereby providing an experience that is more immersive. Further examples of the present disclosure may generate, at the identified time points, signals that may be transmitted to the actuators (e.g., either directly or via a centralized controller) in order to activate the actuators and produce a manipulation of a physical object in the user's vicinity (e.g., produce a physical effect that can be felt by the user). Further examples still may adapt the activation of the actuators for the specific user to whom the XR media is being presented, in order to personalize the immersive experience.

Although examples of the present disclosure may be discussed as operating in real time or near-real time (e.g., as a media stream is being delivered to a user endpoint device), which is useful when streaming live events or media streams for which no metadata has been inserted in advance, the examples of the present disclosure do not always operate in real time. For instance, examples of the present disclosure may also be applied (in less than real time) to enhance pre-produced media streams as a more cost effective (and potentially faster and more accurate) alternative to manual processing.

Figure 1:
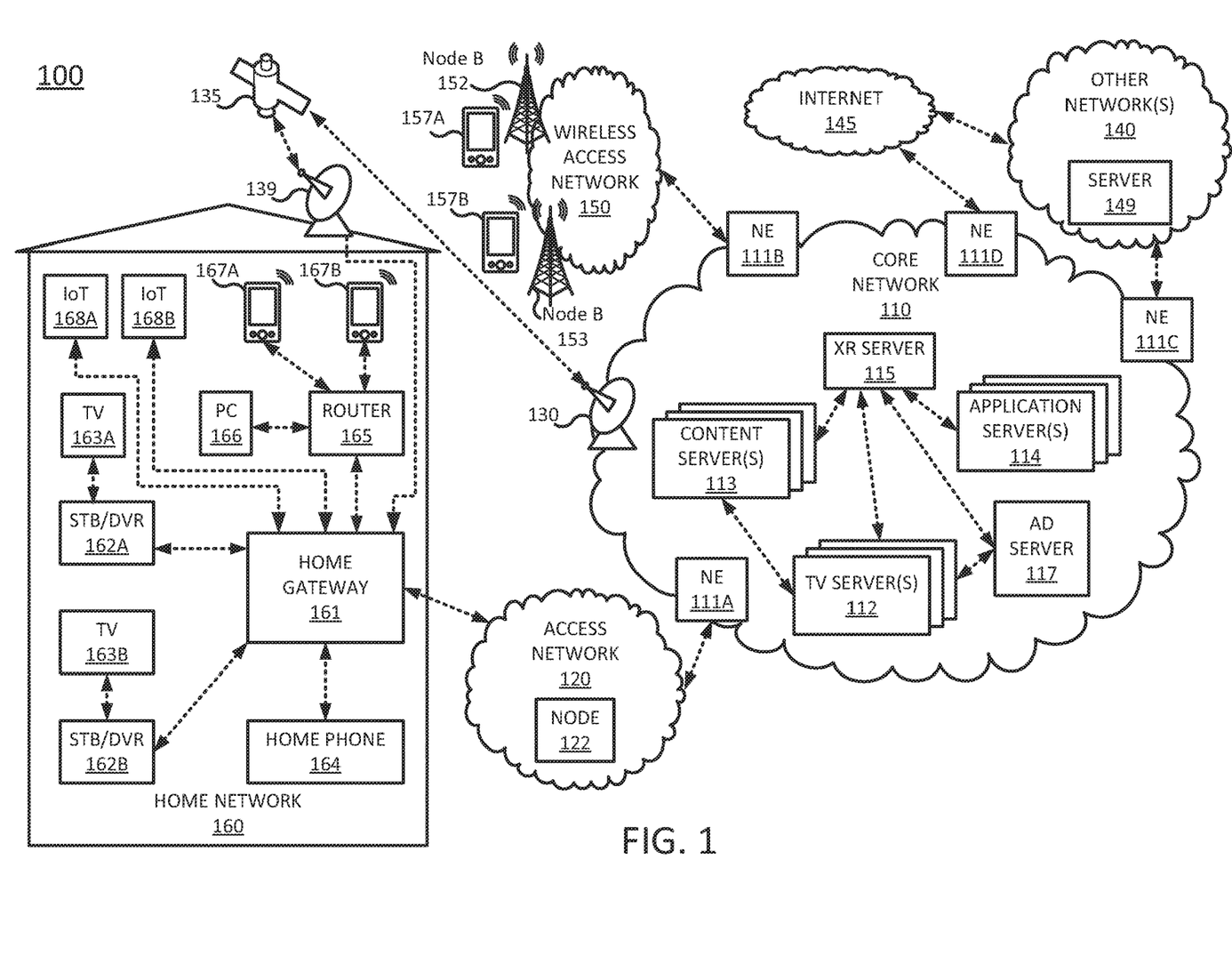
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140 and/or the Internet 145.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker), a gaming console, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140 (which may include servers 149), Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an extended reality (XR) server 115 (e.g., an application server). For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113, advertising server 117, and XR server 115 to select which video programs, or other content and advertisements to provide to the home network 160 and to others.

In one example, content servers 113 may store scheduled television broadcast content for a number of television channels, video-on-demand programming, local programming content, gaming content, and so forth. The content servers 113 may also store other types of media that are not audio/video in nature, such as audio-only media (e.g., music, audio books, podcasts, or the like) or video-only media (e.g., image slideshows). For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various viewers.

In one example, XR server 115 may generate computer-generated content including electronic signals that control actuators on various devices to generate physical effects. When the physical effects are combined with a media stream, and potentially with other computer-generated content generated by the XR server 115 such as computer-generated graphics and/or audio, an immersive media is produced. For instance, a signal may contain an instruction for a smart thermostat to raise a temperature, for a haptic feedback mechanism to provide a rumble effect, or for a digital scent technology device to emit a manufactured scent. The physical effects may be synchronized with the visual and/or audio of the media stream in order to make a user's experience of the media stream more immersive or engaging.

In one example the XR server 115 may store data provided by users of the network 100. The stored data may be provided directly to the XR server 115 by the users, e.g., via the mobile devices 157A, 157B, 167A, and 167B, the PC 166, the home phone 164, the TVs 163A and 163B, and/or Internet of Things (IoT) devices 168A and 168B. Alternatively, the data may be retrieved from network storage, e.g., application servers 114, by the XR server 115. For instance the stored data may comprise user profiles maintained by a network service (e.g., an Internet service provider, a streaming media service, a gaming subscription, etc.), portions of social media profiles maintained by a social media web site (e.g., a social networking site, a blogging site, a photo-sharing site, etc.), or the like. The data may indicate information about the users, such as the users' interests (e.g., favorite genres of movies or television shows, favorite games, etc.), ages, devices (e.g., mobile devices, IoT devices, gaming devices, etc.), medical or other conditions that may affect the extent and the types of the physical effects to which the user may be exposed, and the like.

Figure 3:
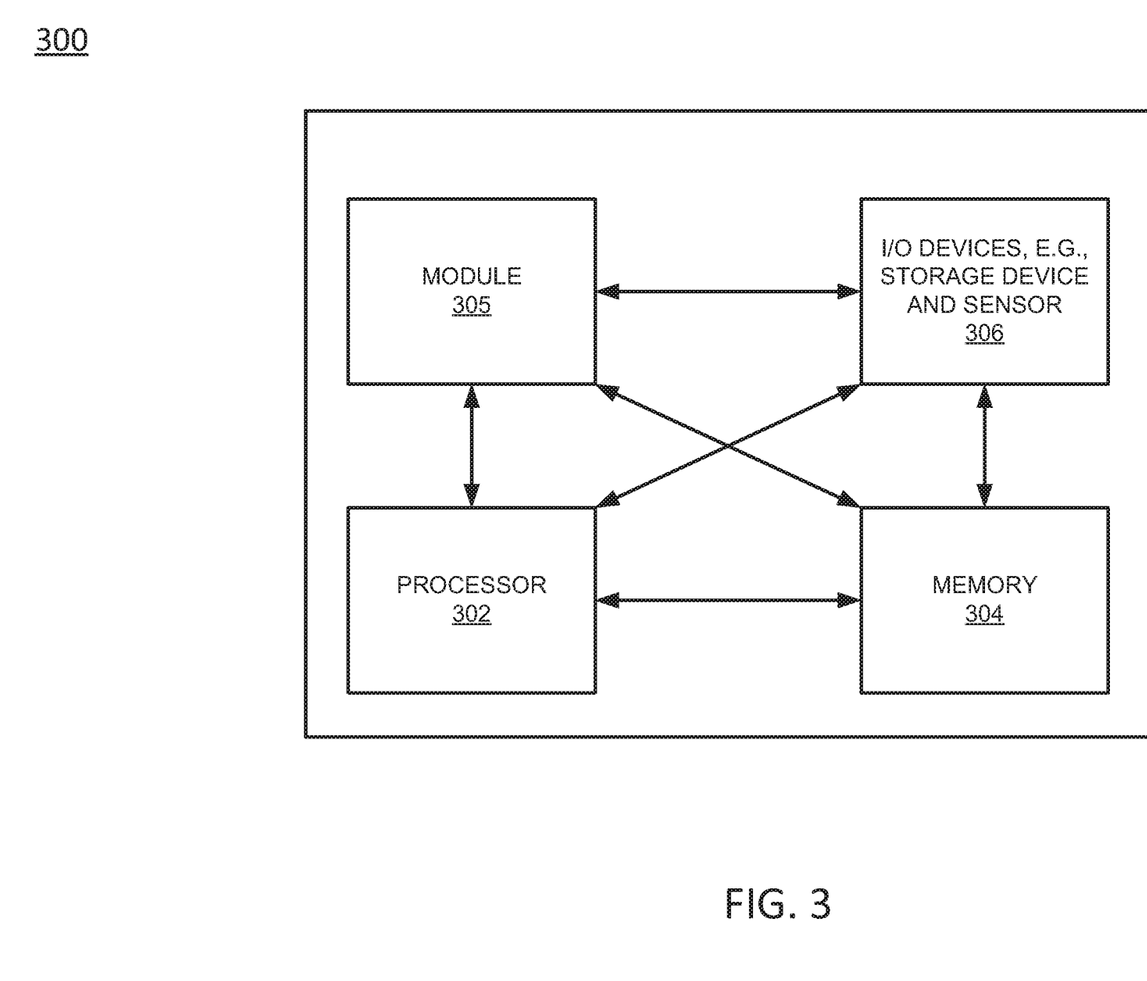
FIG. 3 depicts a high-level block diagram of a computing device specifically programmed to perform the functions described herein.

In one example, any or all of the television servers 112, content servers 113, application servers 114, XR server 115, and advertising server 117 may comprise a computing system, such as computing system 300 depicted in FIG. 3.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

IoT devices 168A and 168B may include any types of devices that are capable of being controlled automatically and/or remotely. For instance, the IoT devices 168A and 168B may include "smart" home devices, such as a smart thermostat, a smart lighting system, or the like. The IoT devices 168A and 168B may also include gaming devices, such as gaming controllers, a gaming chair, or the like. Although FIG. 1 illustrates two IoT devices 168A and 168B, it will be appreciated that the home network 160 may include any number of IoT devices. A greater number and variety of IoT devices may allow for a more immersive experience to be generated.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
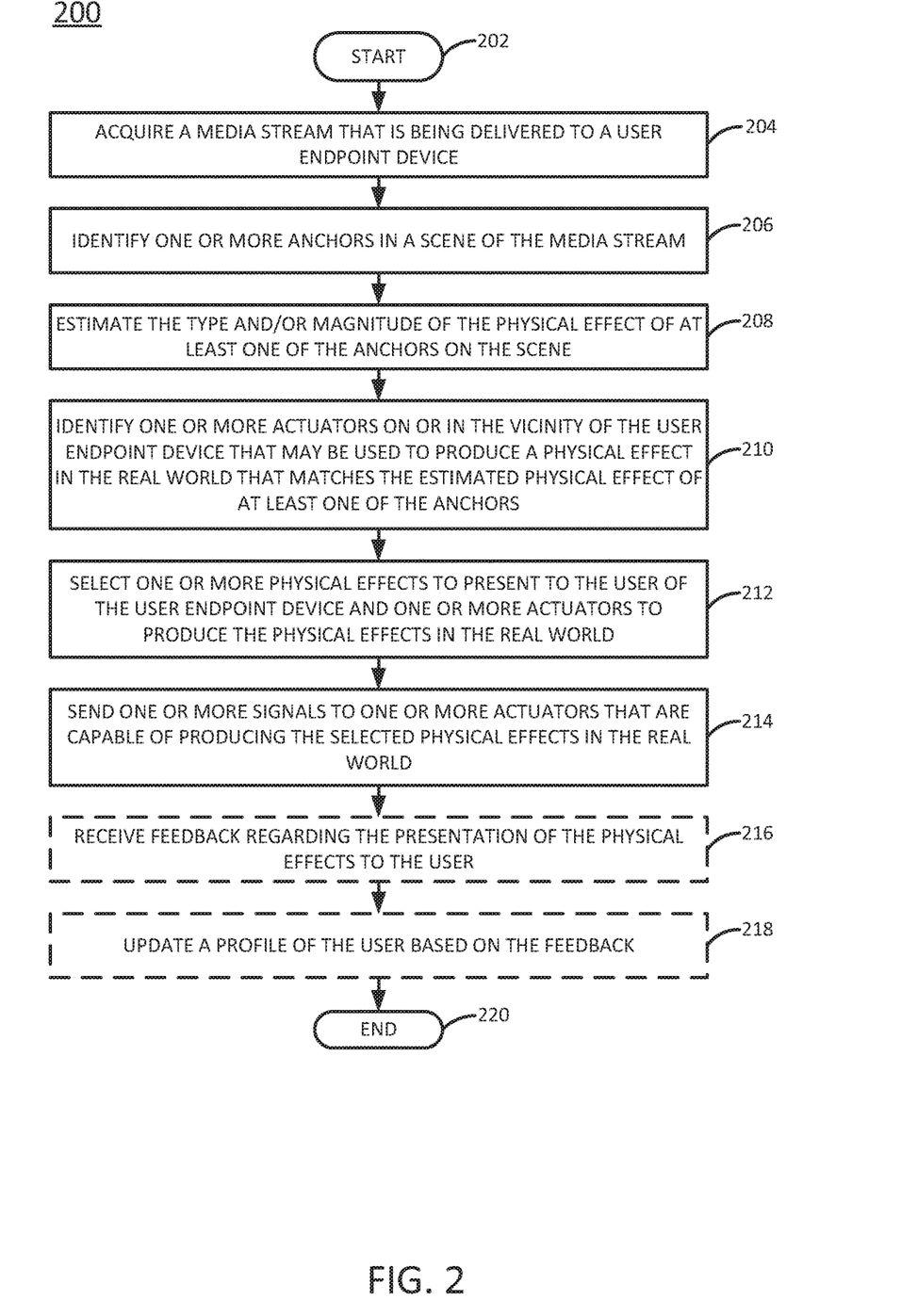
FIG. 2 illustrates a flowchart of a method 200 for activating actuators based on content analysis of the media in accordance with the present disclosure.

To further aid in understanding the present disclosure, FIG. 2 illustrates a flowchart of a method 200 for activating actuators based on content analysis of the media in accordance with the present disclosure. In one example, the method 200 may be performed by an XR server that is configured to generate computer-generated content that may be blended or synchronized with a live or pre-recorded media to produce an immersive media, such as the XR server 115 illustrated in FIG. 1. However, in other examples, the method 200 may be performed by another device, such as the processor 302 of the system 400 illustrated in FIG. 3. For the sake of example, the method 200 is described as being performed by a processing system.

The method 200 begins in step 202. In step 204, the processing system may acquire a media stream that is being delivered to a user endpoint device. In one example, the media stream may comprise a media stream of a live event (e.g., a sporting event or video that is being captured live by the user endpoint device). However, in another example, the media stream may comprise a pre-recorded media stream (e.g., a film, a television show, a video game, or the like). The user endpoint device may be any device that is capable of presenting at least a portion of an immersive media, such as a television, a mobile phone, a head mounted display or other wearable display device, an Internet enabled radio or portable music device, and/or the like. In some examples, the user endpoint device may include or be in communication with a device that provides some sort of tactile or haptic feedback (e.g., buzzing, rumbling, vibrations, and/or the like). In some examples, the user endpoint device may be in communication with one or more IoT devices that are in close proximity to the user endpoint device, such as a smart thermostat, a smart lighting system, a smart speaker system, and/or the like.

In step 206, the processing system may identify one or more anchors in a scene of the media stream (e.g., a scene that has not yet been streamed to the user endpoint device). In one example, an anchor is a presence in the scene (e.g., an object or an environmental effect appearing in the scene) that has a physical effect on the scene. An anchor may therefore potentially serve as a source of a physical effect in the real world (e.g., a physical motion, a tactile effect, a temperature change, and/or the like). The physical effect may be an effect that can be produced by an actuator that is located within some proximity (e.g., within x feet of) of the user endpoint device. For instance, the physical effect could be produced by the user endpoint device, by an IoT device, by a seat or other piece of furniture with an integrated haptic feedback mechanism (e.g., a gaming chair), or by any other device that is capable of producing a physical effect.

In one example, the anchor may be an object (e.g., a person or a thing) that appears in the scene and that interacts with some other object in the scene. For instance, the anchor object may collide with the other object, may push or pull the other object or be pushed or pulled by the other object, or the like. As an example, the anchor may be a skier who has mounted a body camera to himself. The skier may move in a particular way as he skis down the mountain, and may experience different physical effects as a result of interaction with other skiers and objects (trees, moguls, terrain park features, etc.).

In another example, the anchor may be an environmental effect of the scene on the camera(s) that filmed the scene. For instance, a camera filming the scene may shake due to environmental effects (e.g., wind), due to interaction with objects (e.g., a vehicle passing quickly in close proximity), due to shaking of a human operator's hand, and/or the like.

In another example, the anchor may be an event that occurs within the scene, where the event has some physical effect on the scene. For instance, the event may be an explosion, a weather effect (e.g., rain, snow, earthquake).

In step 208, the processing system may estimate the type and/or the magnitude of a physical effect of at least one of the anchors on the scene. For instance, the processing system may use image processing techniques, audio processing techniques, and/or other video analysis techniques on components of the media stream to estimate the magnitude of a force acting on an anchor, or the force generated by the anchor acting on an object. As an example, if the anchor collides with another object, the force of the collision may be estimated based on estimates of the mass of the anchor, the acceleration of the anchor prior to the collision, the mass of the other object, the acceleration of the other object prior to the collision, the distances traveled by the anchor and/or the other object after the collision, or the like. The masses, accelerations, and distances may be estimated using image processing techniques.

Similarly, if the anchor is an event, such as an explosion, the force of the explosion and/or the temperature of the explosion may be estimated based on the size of the explosion, the distance between the explosion and the camera filming the explosion, and/or other quantifiable characteristics that can be estimated based on image processing techniques. If the anchor is a baseball that has just been hit, audio processing techniques may be able to estimate a force with which the bat hit the ball based on the sound of the ball coming off of the bat. Thus, analysis of the various components of the media stream (e.g., visual component, audio component, and/or other components) may allow the physical effects of an anchor on a scene of the media stream to be quantified.

In some examples, if the anchor is rendered using special effects (e.g., in a computer generated media), metadata associated with the media stream may include explicit force analyses.

In step 210, the processing system may identify one or more actuators on or in the vicinity of the user endpoint device that may be used to produce a physical effect in the real world that matches one or more of the estimated physical effects estimated in step 208. For instance, if the anchor comprises an explosion, the estimated physical effects may include a rumbling of a certain magnitude and a sudden surge in temperature up to a certain maximum temperature. The rumbling effect may be produced by a rumble mechanism in the user endpoint device or in a game controller that is communicatively coupled to the user endpoint device. Alternatively, if the user is sitting in a gaming chair or on a similar type of furniture while viewing the media stream, the rumbling effect may be produced by a rumble mechanism in the chair. The temperature effect may be produced by a smart thermostat that controls the ambient temperature of the location in which the user is viewing the media stream.

In step 212, the processing system may select one or more physical effects to present to the user and one or more actuators (e.g., actuators on or in the vicinity of the user endpoint device) to produce the physical effects. In one example, the selection in step 212 is personalized for the user. For instance, the user (and/or the user's devices, including the user endpoint device, IoT devices, and the like) may be registered with a service that provides immersive content, and the service may maintain a database that stores a profile for the user. The profile may include information about the user including preferences, interests, medical conditions, restrictions on content ratings, and the like. Thus, the profile may be used to create a unique immersive experience that is tailored to the user. For instance, if the profile indicates that the user is prone to seizures, the processing system may refrain from selecting physical effects that include the strobing or flashing of bright lights. Similarly, if the user has indicated that he dislikes physical effects that involve temperature changes, the processing system may refrain from selecting physical effects that involve manipulation of a smart thermostat. Thus, the type and/or magnitude of the physical effects presented to the user may be tailored to minimize aggravation of medical conditions, to match selected preferences or interests, to respect content restrictions (e.g., which may be put in place by parents), and the like.

In one example, selection of the physical effects and actuators may also take into account the known capabilities of the user endpoint device and/or devices within the vicinity of the user endpoint device. For instance, the user profile may additional store information about the device used by the user when experiencing immersive media (e.g., including the user endpoint device and/or the devices within the vicinity of the user endpoint device). The information stored for any one of these devices may include, for example, device type (e.g., mobile phone, gaming controller, smart thermostat, etc.), device identifier (e.g., IP address, media access control address, etc.), and device capabilities (e.g., includes rumble mechanism, can operate within predefined temperature range, etc.). In one example, the device capabilities may further indicate the current status of a device's more ephemeral capabilities (e.g., current battery life, current connectivity strength, etc.). Thus, the profile may be used to determine which physical effects can be feasibly produced for the user based on the devices available to the user at the time. For instance, if the profile indicates that the user does not have access to a smart thermostat, then the processing system may disregard any physical effects that require the raising or lowering of the ambient temperature. Similarly, if a physical effect comprises a low-frequency sound effect that the user's speaker system is not capable of producing, then the processing system may instead select a physical effect that comprises a high-frequency vibration to mimic the sound effect. Thus, the type and/or magnitude of the physical effects presented to the user may be tailored to accommodate the capabilities of the devices available to the user.

In step 214, the processing system may send one or more signals to one or more actuators (or devices including actuators) that are capable of producing the physical effects selected in step 212. The signals may control the one of more actuators to produce physical effects in the real world that match estimated physical effects of the one or more actuators in the real world. For instance, if a physical effect comprising the raising of an ambient temperature to simulate a sudden heat surge produced by an explosion, then the processing system may send a signal to a smart thermostat to raise the ambient temperature to a specified temperature for a specified amount of time. Similarly, if a physical effect comprises a rumble to simulate the tremors that may be caused by an explosion, then the processing system may send a signal to a rumble mechanism in a gaming chair, a gaming controller, a mobile phone, or the like to generate a rumble of a specified intensity for a specified amount of time. The signals may indicate a time at which the physical effects should be produced, so that the physical effect is properly synchronized with the media being streamed. For instance, the signal may identify specific frame identifiers of the media or specific time stamps in the media that allow the actuators to properly synchronize the physical effects.

In one example, the signals may be sent directly to the devices that include the actuators for producing the physical effects. In other examples, however, the signals may be sent to a centralized controller, a router, a home gateway, or the like that extracts intended destinations from the signals (e.g., from headers of packets containing the signals) and then forwards the signals to those intended destinations. Upon receipt of the signals, the devices may cache the signals for use at the designated times.

In optional step 216 (illustrated in phantom), the processing system may receive feedback regarding the presentation of the physical effects to the user. In one example, the feedback may comprise explicit feedback. For instance, the user may provide feedback in the form of a verbal statement, a text input, a button push, or the like via a device (e.g., the user endpoint device). Similarly, the user may update his profile to indicate whether or not he liked a specific physical effect. In another example, however, the feedback may be more implicit. For instance, sensors in the user endpoint device and/or in devices in the vicinity of the user endpoint device may be used to monitor the user's reaction to the physical effects. As an example, if the user smiles or cheers, this may be interpreted as a positive feedback. Alternatively, if the user screams, or if his heart rate exceeds some predefined acceptable threshold, this may be interpreted as negative feedback.

In optional step 218 (illustrated in phantom), the processing system may update the user's profile based on the feedback. For instance, the update may indicate that the user does or does not like certain types of physical effects, or likes certain types of physical effects only when subject to certain restrictions (e.g., do not raise the temperature past x degrees Fahrenheit, do not produce a rumbling effect with more than y intensity, etc.). These updates may allow the processing system to better tailor the physical effects to the user in the future (e.g., by ruling out and/or promoting certain types of physical effects in step 212). Thus, future iterations of the method 200 (including future iterations of step 212) may be adjusted based on the feedback received in step 216.

The method 200 may end in step 220. However, it should be noted that the method may also loop back to step 204. For instance, the processing system may continuously iterate through steps 304-318 for as long as the user is viewing the streaming media, so that the physical effects are a consistent part of the immersive viewing experience.

Thus, examples of the present disclosure utilize automated content analytics to provide an immersive media experience. Moreover, since the signals used to control the actuators are generated automatically, with little or no manual human intervention, the immersive media experience can be provided in a more cost-effective manner. The disclosed method can also be used to transform a live media stream, or a pre-recorded media stream for which no immersive metadata has been pre-programmed, into an immersive stream in real or near-real time (e.g. as the media stream is being streamed to a user endpoint device). However, in other examples, the disclosed method is not performed in real time, but could be performed before or after streaming of the media stream. As such, the disclosed method could even be used to transform user-generated content (such as user-generated videos that have been shared via social media) into an immersive media experience.

It should be noted that any given scene of a media may include more than one anchor. For instance, if a user is viewing a skiing scene from the perspective of a skier, the skier may comprise one anchor and the weather (e.g., snow) may comprise another anchor. Thus, the user may feel a rumble as the skier skis through a set of moguls and may also feel a drop in temperature or a gust of wind to mimic the environmental conditions on the mountain. Moreover, the anchor(s) may change from scene to scene, or even within a single scene. For instance, referring back to the skiing scene, a first anchor may correspond to a first skier, and the user may experience the media from the perspective of the first skier. However, when the first skier passes a second skier on the mountain, the anchor may switch to the second skier, and the user may begin experiencing the media from the perspective of the second skier.

Examples of the present disclosure may be extended to synchronize the immersive media experiences of two or more users. For instance, two users may be watching the same football game. However, the first user may have a first player designated as an anchor for the immersive experience, while the second user may have a second player designated as an anchor for the immersive experience. If the first player were to be pushed on the back by the second player, the first user's experience (getting pushed on the back) could be synchronized with the second user's experience (pushing forward on the other player's back).

Further examples of the present disclosure may allow for user-generated communications (e.g., shouts, cheering, feedback from a user's movements) to be shared across two or more collaborative immersive experiences. For instance, if a first user and a second user are watching a live football game and the first user makes a movement that is equivalent to stomping on the bleachers, actuators in the vicinity of the second user may be controlled to mimic the stomping action (e.g., such that the second user can "feel" other spectators stomping on the bleachers).

Examples of the present disclosure also allow for the creation of multiple different immersive experiences based on the same media content, potentially based on different user preferences. For instance, the experience of a user who prefers to watch a football game from the perspective of the crowd could be tailored to mimic crowd-based actions (e.g., cheering, stomping on the bleachers, etc.), while the experience of a user who prefers to watch a football game from the perspective of a player (e.g., through volumetric video) could be tailored to mimic player-based actions (e.g., getting pushed or tackled).

It should also be noted that the personalization of the immersive experience need not necessarily be static. For instance, as discussed above, if a media depicts an explosion, a smart thermostat in the vicinity of the user may raise the ambient temperature so that the user "feels" the heat from the explosion. However, the user may not necessarily remain in one place while viewing the media. For instance, the user may be walking around. In this case, the smart thermostat may be controlled to adjust the amount of heat that the user feels based on the user's movement (e.g., if the user moves closer to the explosion, the ambient temperature may be raised so that the user feels more heat; as the user moves away from the explosion, the ambient temperature may be lowered so that the user feels less heat). Thus, control of the actuators as discussed herein may be further tied to the user's viewing position or location, which may not be static.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a server (such as might be used to perform the method 200) could be implemented as illustrated in FIG. 3.

As depicted in FIG. 3, the system 300 comprises a hardware processor element 302, a memory 304, a module 305 for activating actuators based on content analysis of the media, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for activating actuators based on content analysis of the media may include circuitry and/or logic for performing special purpose functions relating to the operation of a home gateway or AR server. The input/output devices 306 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for activating actuators based on content analysis of the media (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for activating actuators based on content analysis of the media (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:

acquiring, by a processing system in a telecommunications network, a media stream that is being delivered to a user endpoint device in a home network connected to the telecommunications network;

identifying, by the processing system, an anchor in a scene of the media stream, wherein the anchor comprises a presence in the scene that has a physical effect on the scene;

estimating, by the processing system, a type and a magnitude of the physical effect of the anchor on the scene;

identifying, by the processing system, an actuator that is capable of producing a physical effect in the real world to match the physical effect of the anchor on the scene, wherein the actuator is integrated into a system in the home network that comprises at least one of: a smart thermostat, a smart lighting system, or a smart speaker system; and sending, by the processing system, a signal to a home gateway of the home network, wherein the home gateway is to route the signal to the system in the home network, and wherein the signal controls the actuator to produce the physical effect in the real world when the physical effect of the anchor on the scene occurs in the media stream.

2. The method of claim 1, wherein the media stream comprises a stream of a live event, and the identifying the anchor, the estimating, the identifying the actuator, and the sending are performed as the media stream is being delivered to the user endpoint device.

3. The method of claim 1, wherein the anchor is an object that appears in the scene.

4. The method of claim 1, wherein the anchor is an environmental effect of the scene on a camera that filmed the scene.

5. The method of claim 1, wherein the anchor is an event that occurs in the scene.

6. The method of claim 1, wherein the estimating is performed using a video processing technique to analyze a visual component of the scene.

7. The method of claim 1, wherein the estimating is performed using an audio processing technique to analyze an audio component of the scene.

8. The method of claim 1, wherein the physical effect of the anchor on the scene comprises a force acting on or generated by the anchor.

9. The method of claim 1, wherein the physical effect of the anchor on the scene comprises a change in a temperature of the scene that is caused by the anchor.

10. The method of claim 1, wherein the actuator further comprises a haptic feedback device that is integrated in the user endpoint device.

11. The method of claim 1, wherein the actuator further comprises a haptic feedback device that is integrated in a device located in physical proximity to the user endpoint device.

12. The method of claim 1, wherein the identifying the actuator is based in part on a stored preference of a user of the user endpoint device.

13. The method of claim 12, wherein the stored preference relates to a medical condition of the user, and at least one of: a type or a magnitude of the physical effect in the real world is selected to minimize aggravation of the medical condition.

14. The method of claim 12, wherein the stored preference relates to an interest of the user, and at least one of: a type or a magnitude of the physical effect in the real world is selected to match the interest.

15. The method of claim 12, wherein the stored preference relates to a capability of the actuator, and at least one of: a type or a magnitude of the physical effect in the real world is selected to accommodate the capability.

16. The method of claim 15, wherein the capability of the actuator comprises at least one of: a current battery life of the system in the home network into which the actuator is integrated or a current connectivity strength of the system in the home network into which the actuator is integrated.

17. The method of claim 1, further comprising:

receiving, by the processing system, feedback regarding a presentation of the physical effect in the real world to a user of the user endpoint device; and adjusting, by the processing system, a future iteration of the identifying the actuator based on the feedback.

18. The method of claim 1, wherein the anchor is rendered using a special effect, and wherein the estimating is performed using metadata associated with the media stream.

19. A non-transitory computer-readable medium storing instructions which, when executed by a processing system in a telecommunications network, cause the processing system to perform operations, the operations comprising:

acquiring a media stream that is being delivered to a user endpoint device in a home network connected to the telecommunications network;

identifying an anchor in a scene of the media stream, wherein the anchor comprises a presence in the scene that has a physical effect on the scene;

estimating a type and a magnitude of the physical effect of the anchor on the scene;

identifying an actuator that is capable of producing a physical effect in the real world to match the physical effect of the anchor on the scene, wherein the actuator is integrated into a system in the home network that comprises at least one of: a smart thermostat, a smart lighting system, or a smart speaker system; and sending a signal to a home gateway of the home network, wherein the home gateway is to route the signal to the system in the home network, and wherein the signal controls the actuator to produce the physical effect in the real world when the physical effect of the anchor on the scene occurs in the media stream.

20. A device comprising:

a processing system including at least one processor of a telecommunications network; and a computer-readable medium storing instructions which, when executed by the processing system, cause the processing system to perform operations, the operations comprising:

acquiring a media stream that is being delivered to a user endpoint device in a home network connected to the telecommunications network;

identifying an anchor in a scene of the media stream, wherein the anchor comprises a presence in the scene that has a physical effect on the scene;

estimating a type and a magnitude of the physical effect of the anchor on the scene;

identifying an actuator that is capable of producing a physical effect in the real world to match the physical effect of the anchor on the scene, wherein the actuator is integrated into a system in the home network that comprises at least one of: a smart thermostat, a smart lighting system, or a smart speaker system; and sending a signal to a home gateway of the home network, wherein the home gateway is to route the signal to the system in the home network, and wherein the signal controls the actuator to produce the physical effect in the real world when the physical effect of the anchor on the scene occurs in the media stream.

* * * * *